United States Patent

Cressman

[15] 3,664,161
[45] May 23, 1972

[54] FIBERGLASS PROCESSING TANK

[72] Inventor: Fred D. Cressman, Waterloo, Ontario, Canada

[73] Assignee: Canada Barrels & Kegs Limited, Waterloo, Ontario, Canada

[22] Filed: Oct. 6, 1970

[21] Appl. No.: 78,503

[52] U.S. Cl. .............................................................. 69/30
[51] Int. Cl. ........................................................ C14c 15/00
[58] Field of Search ................................ 69/30; 68/142, 144

[56] References Cited

UNITED STATES PATENTS 2,836,400   5/1958   Jackson .............................. 68/142 X
3,280,604   10/1966   Panker ................................ 68/142 X
3,518,849   7/1970   Eggleston ................................ 69/30

Primary Examiner—Alfred R. Guest
Attorney—George H. Riches

[57] ABSTRACT

A molded resin-bonded fiberglass processing tank having a hub structure formed integrally with the end wall. The hub structure is made up of a laminated core overlayed with a fiberglass laminate. A gudgeon is attached to the core. Reinforcing ribs are laid on the end wall, the ribs, which radiate from the hub, extend over the contiguous portions of the cylindrical wall of the tank. The ribs are formed with a center core, preferably of foamed plastic. A belt track and a support ring are also formed integrally on the cylindrical wall of the tank.

13 Claims, 6 Drawing Figures

Inventor
Fred D. Cressman
By George T. Pinkes
Attorney

Inventor
Fred D. Cressman
By [signature]
Attorney

Inventor
Fred D. Cressman

By
Attorney

FIBERGLASS PROCESSING TANK

For the processing of hides, it has now been proposed to use a rotating drum similar to the truck mounted concrete mixers presently in use. These drums have been modified for use in curing hides.

The main advantage is that, because curing can be completed overnight, there is no time lag involved in shipping cured hides from the packing house. Another advantage is the elimination of some labor costs in hide curing and handling because this type of equipment can be charged, operated and discharged automatically, e.g. less handling.

However, one disadvantage of the curing drums presently in use is that, being made of metal, they are subject to serious corrosion from the chemicals used in the curing solution. The chemicals attack the metal changing the pH of the solution and thus the processing variables.

Still another disadvantage resides in the fact that the blades and the interior surface of the drum often present rough and sharp corners which will damage the hides during the curing process.

It has heretofore been thought to be impractical to construct a resin bonded fiberglass laminated drum for the processing of hides because of the heavy weights involved and the stresses that had to be endured.

To rotating drum of the present invention overcomes the foregoing and other disadvantages and also provides a drum which is constructed in a manner that it provides a rotating processing drum which will stand up to the heavy loads and stresses which are met with in the processing of hides.

The advantages of a fiberglass tank consist generally of the following features:

a. They are corrosion resistant;
b. the solution is not subject to pH change;
c. they have a smooth interior which eliminates hide damage;
d. smooth interior eliminates color changeover problems;
e. they have longer life and less maintenance.

The invention is intended for use with rotating tanks for mixing materials. One type of use is in the processing of hides and the invention will be described in relation to such use. It is to be understood that this is being done by way of illustration and not as a limitation.

The rotating tank may be one of two types, namely:

a. A cylindrical tank, closed at one end and open at the other, the tank being mounted to rotate on an inclined axis with the open end at the higher elevation; or
b. a cylindrical tank mounted on a horizontal axis, said tank being provided with side openings.

Whichever form the tank takes, it will embody the construction which is the subject of this invention which relates to the end wall construction and other features to be particularly disclosed and will be defined in the claims.

The invention will be described as applied to an inclined rotating tank having a closed end wall constructed in accordance with this invention and an open end. When the tank is to be closed at both ends, both end walls will be similarly constructed.

The end wall construction for a cylindrical processing tank of molded fiberglass resin laminate having incorporated therein support means rotatably supporting said end, which comprises:

a. an axial hub having a ring shaped steel base with outwardly projecting threaded studs, said base being embedded in the wall and overlayed with fiberglass laminate;
b. a central core of reinforcing material overlaying said base;
c. a first fiberglass laminate enclosing said core with said studs protruding therethrough;
d. a plurality of stiffening ribs formed radially on the end, said ribs radiating from the perimeter of the central core and extending over the outer wall of the drum, each rib comprising a forming core, a second fiberglass resin laminate enclosing the forming core and bonded to the perimeter of the central core, the end wall and the outer cylindrical wall of the tank;
e. a third fiberglass laminate overlaying the second and first fiberglass laminates; and
f. a gudgeon bolted to said hub.

The preferred embodiment of the invention will now be described with reference to the accompanying drawings in which.

Figure 1:
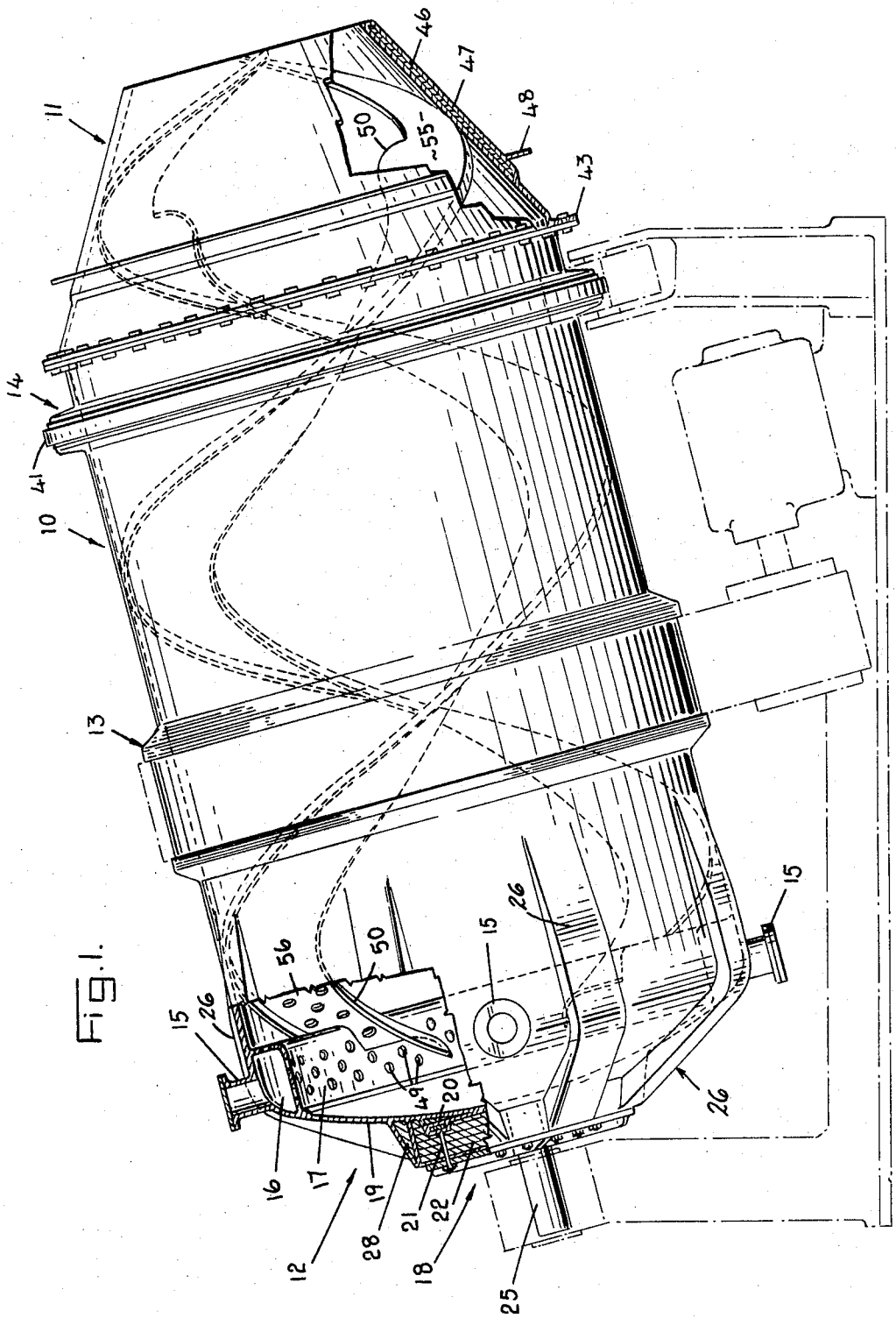
FIG. 1 is a side elevation, partly cut away to show novel features of construction to be described in detail.
Figure 4:
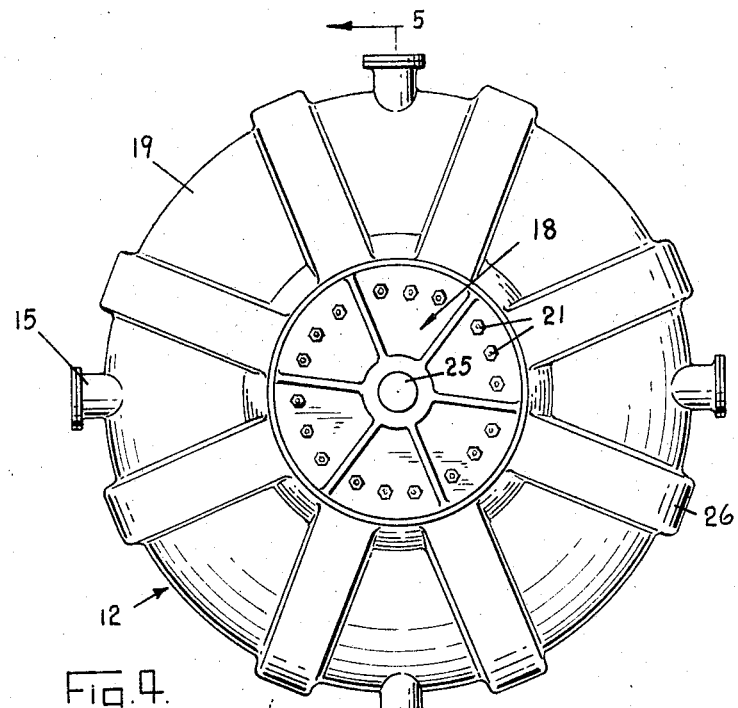
FIG. 4 is a view of the closed end of the drum.
Figure 3:
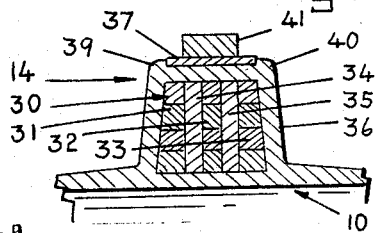
FIG. 3 is a fragmentary view on an enlarged scale to show the construction of the support ring in greater detail.

Referring first to FIG. 1, in particular, the processing tank comprises a cylindrical shaped drum 10 having a funnel shaped open front end 11, a closed end 12, a belt track 13, a support ring 14, a plurality of diametrically opposite outlets 15 which are adjacent the closed end (also called the rear end) which communicates with a fluid chamber 16 formed by a perforate wash-ring 17 and a hub 18 which is formed on the closed or rear end. These elements will now be described with reference to the accompanying drawings. It is however, to be understood that the following description is given by way of illustrating the invention and not to be taken as a limitation thereof.

The cylindrical drum 10 is made by laying-up a shell of resin bonded fiberglass laminate on a mold preformed to the size and shape which the drum is to have. At the same time the end or rear wall 19 is the closed end on which the hub 18, to be more particularly described, is mounted. At the same time, the ports for outlets 15 are formed integrally with the shell of resin bonded fiberglass laminate. The cone shaped end 11 will be described later.

THE HUB

The hub which is mounted on the end wall 19 comprises a steel ring 20 containing threaded studs 21, a fiberglass sleeve 9, a core 22 overlayed with a resin bonded fiberglass laminate 23, a gudgeon 24 with its integrally formed axle 25 and hub projection 8, which part of gudgeon, is fitted into a fiberglass sleeve 9. The fiberglass sleeve 9 to the correct outside diameter of the internal diameter projection 8 of gudgeon 25, is placed in position during the forming of the end wall 19. The sleeve is mounted axially on the end wall 19 which will thus ensure that the gudgeon 25 when mounted in position will be accurately disposed on the axis of the tank. The purpose of the sleeve is two-fold. It not only locates and maintains the gudgeon square and perpendicular with a locating rod, but it also protects the hub projection 8 of the gudgeon from corrosion attack. It is important that the axle 25 be co-axial with the axis of rotation of the drum. The method of properly locating the steel ring 20 containing the studs 21 which are to hold the gudgeon located in place is as follows. Through the center of the end wall 19 a centering rod is located. The gudgeon, with the steel ring attached in place, is then slipped over the centering rod, at which time projection 8 slips into sleeve 9, which thus locates the steel ring in its proper position. The ring is then bonded to the end wall with a resin bonded fiberglass laminate. The gudgeon is then removed. The core 22, which surrounds the sleeve, is made of reinforcing material preferably laminated wood, the thickness of the core being adjusted to give the correct hub depth. The core and sleeve are bonded together and the core is then overlayed with resin bonded fiberglass laminate which bonds the core and the steel ring to the closed end rear wall 19. After the wood, which forms the core, has been located over the ring containing the studs, the gudgeon is placed on the studs and by tightening the bolts on the gudgeon ring, the wood is forced into position. Upon curing, the gudgeon is again removed. After removal of the gudgeon, a further laminate of resin bonded fiberglass laminate is layed over the coring material to strengthen the build-up, and to tie the wood core to the tank end wall. Each additional laminate makes the previous parts an integral part of the end wall of the tank.

RIBS

Upon completion of the laminate over the center hub, the ribs, generally indicated by the number 26 are formed in the following manner. The rib forming cores 27, which are made preferably from foam cut to the shape of the ribs, are laid on the end wall and over the adjacent portion of the outer cylindrical wall of the tank. In addition to giving shape to the ribs, the forming core is used to prevent, in case of leakage, the ribs from filling with fluid. After the rib cores 27 are properly located on the tank, an additional resin bonded fiberglass laminate is carried out to form the ribs which are also bonded to the end wall and the drum wall. The thickness over these ribs is by design and is a critical part of the stiffener factor. It will be noted that on large tanks, such as the one illustrated, the ribs are carried down around the radius to distribute the stress built up over the entire tank and to carry it on into the drum wall. On smaller drums, the ribs may stop at the radius of the end wall 19. Upon partial completion of the laminate of the end ribs, blocks 28 are cut to fit between the ribs preferably with a taper sloping out from the top of the hub to the end wall 19. These blocks perform two functions: (a) they separate the ribs and prevent them from working around the hub area, and (b) they distribute the stress concentration built up by running the ribs together at the hub. After the blocks are placed, they are again similarly laminated into the wall 19. When these parts are all complete, a layer of laminate 26a is placed over the end hub into which the gudgeon will now be squeezed. Depending on design, the gudgeon may or may not be put in using a mould releasing agent, which would, or would not allow the gudgeon to be removed. The gudgeon is then placed over the studs and the nuts are tightened, squeezing the gudgeon into place. It must be noted that during all operations concerning the gudgeon the fixed centering rod is in place at all times keeping the gudgeon in line and on center and perpendicular to the hub.

BELT TRACK

Figure 6:
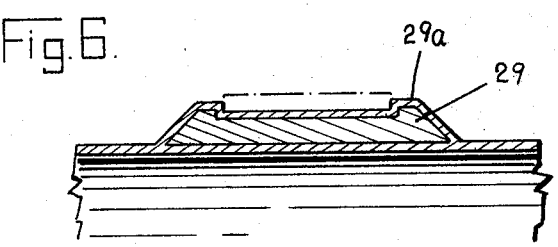
FIG. 6 is a fragmentary section through the belt track of the drum.

This concerns the construction of the belt track 13 for a fiberglass tanning drum to be belt driven. The belt track 13 principle is that of a sandwich construction. In order to maintain stiffness where the pressure is applied by the belt, a core material 29 (FIG. 6), preferably of wood and of the compression type, is laid onto the tank wall which is suitably reinforced and then the belt track is formed by machining the wood surface to the correct curvature concentric with the axis of rotation. Over the track thus formed, a resin-bonded fiberglass laminate 29a is again placed making the belt track an integral part of the drum. The belt track is also used as a device to make the tank round in this area. If in the course of molding, the track is made slightly off center, the machining gives a uniform diameter with respect to the drum axis.

SUPPORT RING

A support ring 14 is adjacent the front of the inclined mixer type of tanning drum. The support ring 14 includes an inertial ring 30 which consists of a core made from three separate rings 31, 32, 33, of laminated balsa wood, the rings being separated from each other by fiberglass laminate rings 34, 35, the whole being overlayed with a fiberglass laminate 36 and bonded to the cylindrical wall of the tank.

The purpose of the core is to allow some working to prevent this large mass from cracking when it is working on the drum. The purpose of the fiberglass is to provide enough resistance to bending to support the drum. The alternate layers of balsa wood which form the core, are covered with a fiberglass laminate which bonds the whole to the drum wall. A wear ring 37 is located on this support ring and retained therein by a build-up of the fiberglass to form flanges 39, 40. The heavy laminate 36 is placed over the inertial ring 30 to tie this ring into the drum wall and to prevent the ring 30 from shifting laterally. It also stiffens the drum and provides a base for the stainless steel wear ring 37 that is placed on this ring, a further heavy support ring 41 is mounted on the wear ring 37. The outer ring surface of the finished support ring is ground or machined to an outside diameter over which the stainless steel wear ring 37 is forced into place and then locked in by the laminate which forms flanges 39, 40. The wear ring 37 and support ring 41 serve two purposes; they prevent wear of the fiberglass while running on the idler rollers which support the drum as well as prevent any local buckling of the fiberglass due to the high forces acting on the roller.

CONE END OF DRUM

Figure 2:
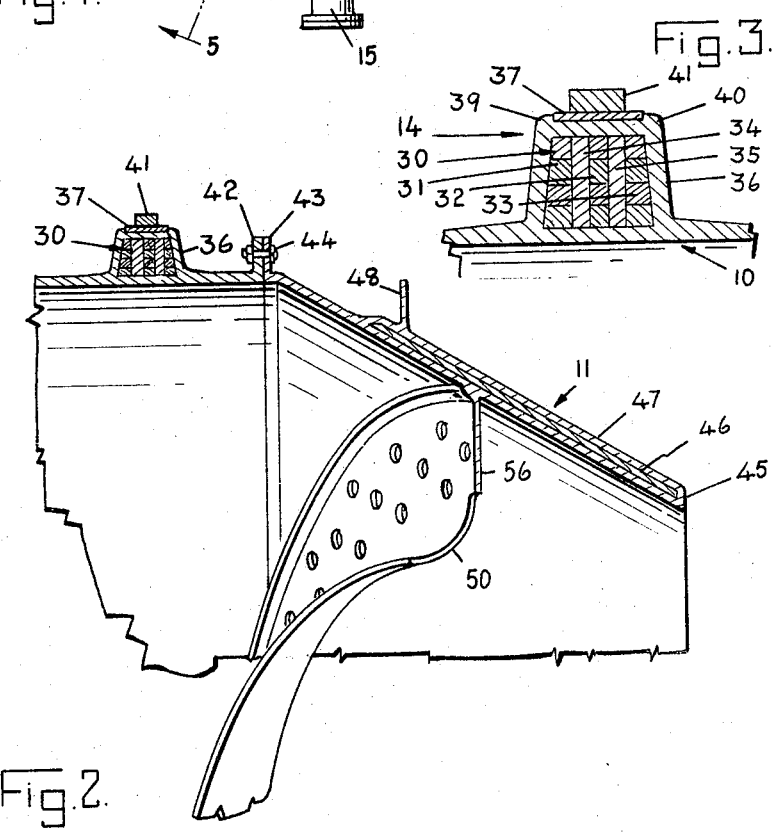
FIG. 2 is a longitudinal section through a portion of the cone end of the drum.
Figure 5:
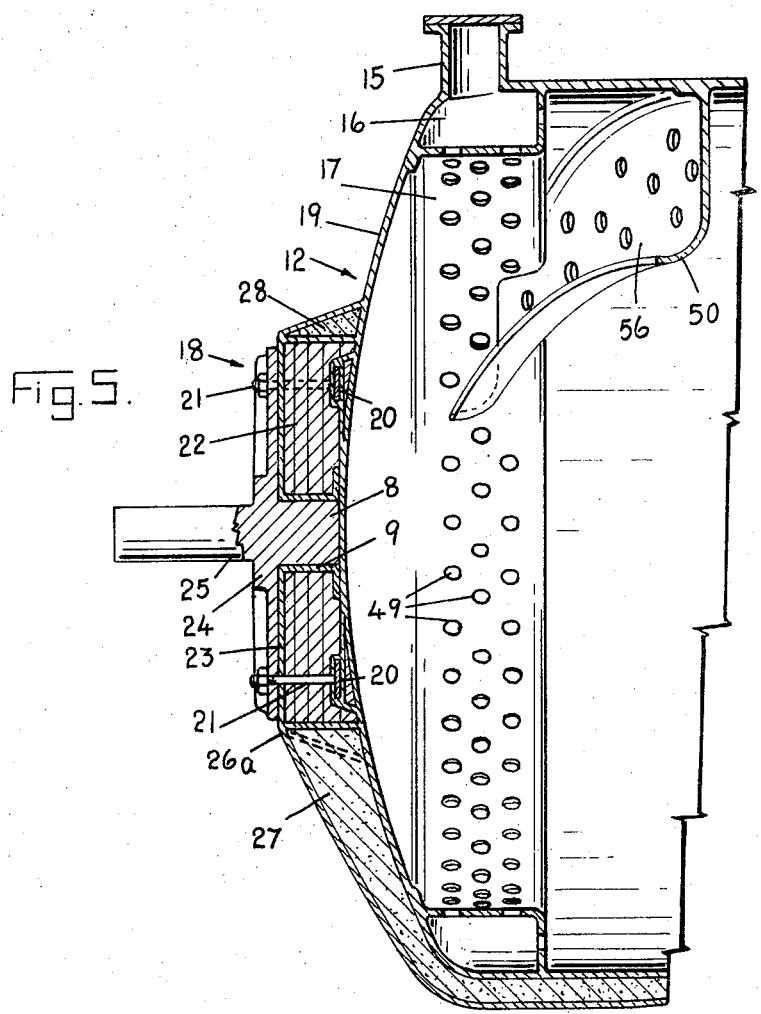
FIG. 5 is a cross section on the line 5—5 of FIG. 4.

The tanning drum is made in two parts as is clearly shown in FIGS. 1 and 2; the front cone and the rear tank section. The drum 10 is formed at the front end with a flange 42 and the cone is formed with a flange 43, both of moulded fiberglass only. The flanges are bolted together by bolts 44. The purpose of flanges is as follows: (1) they increase the inertia of the drum wall to prevent bending; (2) they provide a means of clamping the cone and drum together; (3) they provide a means of removing the cone for doing any repair work or modifications to the drum, or placing or removing parts inside the drum. The flanges are constructed entirely of fiberglass laminate and are joined by convenient methods such as bolting, clamping, laying up together, etc. A secondary feature of the two flanges which clamp the cone and drum together is that is also acts as a secondary drip ring.

THE CONE

The cone or front section of the tank is designed for the tanning industry. The first 4 inches of the cone at the tapered end 45 is built up of solid fiberglass laminate providing a solid initial block to prevent bending and wear. Beyond the wall thickness, by design, the cone is then cored as shown at 46, with a suitable material, for a large portion of the conical section. Over this core is placed an additional fiberglass laminate 47. The purpose of the core is two-fold, it stiffens the cone to prevent deflection and primarily is a protection for the inner part of the drum wall, so that if something should pierce the initial laminate it will go into the coring material. This will result in less likelihood of damage occurring to the inner laminate on the cone which is the most critical area of the drum wall which could be damaged. This also would result in an easily repairable area due to the properties of the fiberglass. The cone also has a downwardly projecting dip-lip 48. This lip is provided so that any material which spills out of the open end of the drum will drop off of the cone before it has a chance to run down onto the working parts of the drum or get onto the area of the flanges which join the cone and drum together.

WASH RING

The inside of the drum at the back has the wash-ring 17 laminated into the rear of the drum to form fluid passage 16, entrance to which is obtained through perforations 49 formed through the ring 17. This wash-ring is designed so that it will give 360° of ports which will freely allow flow to the drains 15 of the drum. It is also designed so that it will not contain a large amount of tanning fluid, thus minimizing the amount of dead space in the drum. This wash-ring will also be of completely corrosion resistant fiberglass.

SPIRAL BLADES

Also included in the interior is a pair of spiral blades 55, 56 which are made of fiberglass laminate bonded to the interior of the drum. This forms a continuous scoop which continually turns the hides in the treating liquid. The free edge of the blades are formed with a radial scoop 50 to lift the hides out of the liquid and then drop them back. This adds greatly to the hide processing.

What is claimed is:

1. In a processing tank of molded fiberglass resin laminate having a main cylindrically shaped body portion, an end wall construction closing at least one end of said body, said end wall having incorporated therein support means comprising:
   a. an axial hub having a ring shaped steel base with outwardly projecting threaded studs, said base being embedded in the wall and overlayed with fiberglass laminate;
   b. a central core of reinforcing material overlaying said base;
   c. a first fiberglass laminate enclosing said core with said studs protruding therethrough;
   d. a plurality of stiffening ribs formed radially on the end, said ribs radiating from the perimeter of the central core and extending over the adjacent outer surface of the cylindrical wall of the body portion, each rib comprising a forming core, a second fiberglass resin laminate enclosing the forming core and bonded to the perimeter of the central core, the end wall and said outer surface of the cylindrical wall of the body portion;
   e. a third fiberglass laminate overlaying the second and first fiberglass laminates; and
   f. a gudgeon bolted to said hub.

2. A processing tank according to claim 1 in which the hub core is comprised of a plurality of sheets of wood, said sheets being bonded together by a fiberglass laminate.

3. A processing tank according to claim 1 in which the core of the stiffening ribs is comprised of foamed plastic material.

4. A processing tank according to claim 1 in which the hub core is comprised of laminated sheet material and the core of the stiffening ribs are comprised of foamed plastic material.

5. A processing tank according to claim 1 including a block fitted between each pair of rib ends, said blocks being permanently bonded to the ribs and the hub by a resin-bonded fiberglass laminate.

6. A processing tank according to claim 5 in which the hub core is comprised of a plurality of sheets of wood.

7. A processing tank according to claim 5 in which the core of the stiffening ribs is comprised of foamed plastic material.

8. A processing tank according to claim 5 in which the hub core is comprised of laminated sheet material and the core of the stiffening ribs are comprised of foamed plastic material.

9. A processing tank according to claim 1 including a belt track formed integrally with the outer wall of and on the body portion adjacent the closed end, said track comprising a compression type core and a resin-bonded fiberglass laminate overlaying the core and bonded thereto and to the cylindrical outer wall of the body portion.

10. A processing tank according to claim 9 including an open opposite end, a support inertial ring formed integrally with and on the body portion adjacent the open end, said ring comprising a laminated core, a resin-bonded fiberglass laminate overlaying the core and permanently bonded thereto and to the body portion outer wall and a steel annular wear plate mounted on the internal ring.

11. In a molded fiberglass resin laminate cylindrical tank having a reinforced closed end, said tank being mounted for rotation on an axis, a belt track molded integrally with the outer wall of said tank, said track comprising a central band of wood surrounding the outer wall and bonded thereto by fiberglass resin laminate and a covering of fiberglass resin laminate laid over said band and bonded thereto and to the outer wall.

12. In a molded fiberglass resin laminate cylindrical tank having a reinforced closed end, said tank being mounted for rotation on an axis, a trunion supporting one end of the tank, a belt track molded integrally with the outer wall of said tank, said track comprising a central band of wood surrounding the outer wall and bonded thereto by fiberglass resin laminate and a covering of fiberglass resin laminate laid over said band and bonded thereto and to the outer wall and an inertial ring running on idlers supporting the other end, said inertial ring comprising a plurality of rings of stiffening material, each stiffening ring being separated from and bonded to the adjacent stiffening ring by a fiberglass resin laminate ring bonded to the outer cylindrical wall of the tank and a cover of fiberglass resin laminate laid over and bonded to the stiffening ring and the fiberglass resin laminate ring, said cover being bonded to the outer cylindrical wall.

13. In a molded fiberglass resin laminate cylindrical tank mounted for rotation on an inclined axis and having its closed end at an elevation lower than the front end, a perforate wash-ring mounted inside the tank adjacent to but spaced from the closed end, a fluid chamber formed by said wash-ring in the tank adjacent said closed end and fluid discharge outlets through the tank wall communicating with said chamber.

* * * * *